US008712411B1

(12) United States Patent
Puliatti et al.

(10) Patent No.: US 8,712,411 B1
(45) Date of Patent: Apr. 29, 2014

(54) VARYING LATENCY TIMERS IN A WIRELESS COMMUNICATION SYSTEM

(75) Inventors: Dante A. Puliatti, Shawnee, KS (US); Trinh D. Vu, Ashburn, VA (US); Robert P. Dill, Overland Park, KS (US); John D. Sumler, Bonner Springs, KS (US); Harry H. Lai, Overland Park, KS (US); Louie E. Wingo, Liberty, MO (US)

(73) Assignee: Sprint Spectrum L.P., Overland Park, KS (US)

(*) Notice: Subject to any disclaimer, the term of this patent is extended or adjusted under 35 U.S.C. 154(b) by 251 days.

(21) Appl. No.: 13/195,794

(22) Filed: Aug. 1, 2011

(51) Int. Cl.
*H04W 4/00* (2009.01)

(52) U.S. Cl.
USPC ............... 455/435.1; 455/434; 455/435.3

(58) Field of Classification Search
USPC ......... 455/517–520, 553.1, 90.2, 78, 79, 500, 455/426.1, 412.1, 414.1, 416, 420, 455/433–435.1, 435.3; 370/352, 389, 338, 370/328
See application file for complete search history.

(56) References Cited

U.S. PATENT DOCUMENTS

| | | | |
|---|---|---|---|
| 6,185,414 B1 * | 2/2001 | Brunner et al. | 455/406 |
| 6,282,431 B1 * | 8/2001 | Konno | 455/425 |
| 7,522,612 B1 * | 4/2009 | Brundert et al. | 370/398 |
| 7,636,581 B1 * | 12/2009 | Choksi et al. | 455/519 |
| 8,233,929 B2 * | 7/2012 | Lee et al. | 455/518 |
| 8,422,998 B2 * | 4/2013 | Herrero Veron et al. | 455/414.1 |
| 2003/0063610 A1 * | 4/2003 | Yik et al. | 370/392 |
| 2003/0207683 A1 * | 11/2003 | Lempio et al. | 455/422.1 |
| 2004/0192367 A1 * | 9/2004 | Barros et al. | 455/521 |
| 2005/0060410 A1 * | 3/2005 | Wu et al. | 709/227 |
| 2005/0097196 A1 * | 5/2005 | Wronski et al. | 709/223 |
| 2005/0124358 A1 * | 6/2005 | Willey | 455/458 |
| 2007/0115808 A1 * | 5/2007 | Ying | 370/222 |
| 2008/0037494 A1 * | 2/2008 | Hietalahti et al. | 370/338 |
| 2008/0130537 A1 * | 6/2008 | Kim et al. | 370/310 |
| 2008/0280608 A1 * | 11/2008 | Yu et al. | 455/435.1 |
| 2009/0271864 A1 * | 10/2009 | Dietrich et al. | 726/23 |
| 2010/0061328 A1 * | 3/2010 | Walldeen et al. | 370/329 |
| 2010/0265908 A1 * | 10/2010 | Xue et al. | 370/329 |
| 2010/0269114 A1 * | 10/2010 | Li et al. | 718/101 |
| 2010/0273482 A1 * | 10/2010 | Jain et al. | 455/435.1 |
| 2011/0070887 A1 * | 3/2011 | Wu | 455/435.1 |
| 2011/0299491 A1 * | 12/2011 | Jang et al. | 370/329 |
| 2012/0014380 A1 * | 1/2012 | Wu | 370/352 |
| 2012/0106431 A1 * | 5/2012 | Wu et al. | 370/312 |
| 2012/0134352 A1 * | 5/2012 | Vu | 370/347 |
| 2012/0295617 A1 * | 11/2012 | Anchan et al. | 455/435.1 |

* cited by examiner

*Primary Examiner* — Dominic E Rego

(57) ABSTRACT

In systems and methods of varying a latency timer in a wireless communication system, a network identifier associated with an access node in communication with a wireless device is received at a communication node during the establishment of a communication session between a wireless device and the communication node. At least one latency timer criteria is determined based on the network identifier, and at least one latency timer is adjusted according to the latency timer criteria.

15 Claims, 11 Drawing Sheets

US 8,712,411 B1

VARYING LATENCY TIMERS IN A WIRELESS COMMUNICATION SYSTEM

TECHNICAL BACKGROUND

In a typical wireless communication network which enables push-to-talk (PTT) communication, an originating wireless device sends a PTT call request to a target wireless device, and when the target wireless device provides an appropriate response, PTT communication is established between the originating and target wireless devices.

To address latency inherent in network communications, timers are used in the network to measure time periods in which messages related to device registration and call setup are expected to be received. If expected messages are not received or a process must be completed during the time period, the registration or the call setup are deemed to fail, and a new attempt to register or set up a call is required.

In wireless networks comprising substantially uniform latency, for example, because the network comprises uniformly low latency technology, a single group of timer settings can be used for the entire network. However, if a network comprises low latency and high latency components, such as when a wireless network expands to encompass a plurality of pre-existing networks of varying latency technologies, or when several networks are integrated into a new larger network, a single group of timer settings will not suffice for the entire network. Global timer settings appropriate for a low latency network will tend to cause to registration and call setup failures when applied to high latency networks; timer settings appropriate for high latency networks will tend to cause network delay and inefficient use of network resources when applied to low latency networks.

OVERVIEW

Systems and methods for varying a latency timer in a wireless communication system are provided. A network identifier associated with an access node in communication with a wireless device is received at a communication node during service registration or during the establishment of a communication session between a wireless device and the communication node. At least one latency timer criteria is determined based on the network identifier, and at least one latency timer is adjusted according to the latency timer criteria. In operation, a high call completion rate can be maintained while increasing network efficiency and decreasing impact to the overall latency for call setup.

DETAILED DESCRIPTION

In an embodiment, a network identifier is received at a communication node during service registration or the establishment of a communication session between a wireless device and the communication node. The network identifier can identify a network type through which the wireless device is in communication with the communication network. At least one latency timer criteria is determined based on the network identifier, and at least one latency timer is adjusted according to the latency timer criteria. Thus, a latency timer in the wireless communication system can be dynamically adjusted according to the network identifier. In an embodiment, the network type can be derived from the network identifier. In an embodiment, the system can wait for a period of time to complete message exchanges on a per-network access basis to maintain high call completion rate while improving overall network efficiency and reducing call latency during call failures.

Figure 1A:
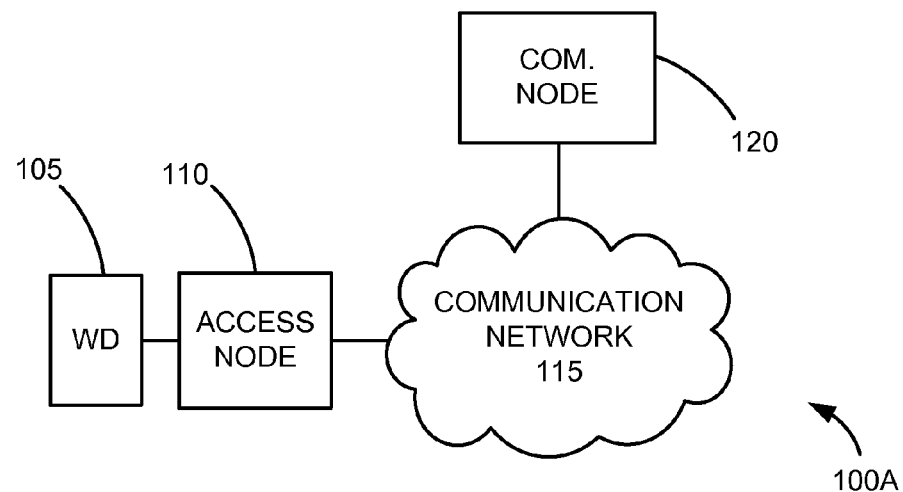
FIG. 1A illustrates an exemplary communication system.

FIG. 1A illustrates an exemplary communication system 100A comprising a wireless device 105, an access node 110, a communication network 115, and a communication node 120. Other network elements may be present in the communication system 100A to facilitate wireless communication but are omitted for clarity, such as gateways, routers, mobile switching centers, and location registers such as a home location register or visitor location register. Examples of a wireless device 105 include a telephone, a computer, a personal digital assistant, an internet access device, or other device capable of wireless communication, including combinations thereof. Wireless device 105 can also be capable of PTT wireless communication. Access node 110 communicates with the wireless device 105, and can be for example a base transceiver station and an eNodeB radio device. Communication network 115 is a network or internetwork and is in communication with the access node 110. Communication node 120 is a network node which permits the wireless device 105 to register with a communication system, and is in communication with the communication network 115. In a dispatch communication system, an example of the communication node 120 can be a dispatch application server or high performance push-to-talk server. The wireless device 105, the access node 110, the communication network 115, and the communication node 120 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Figure 1B:
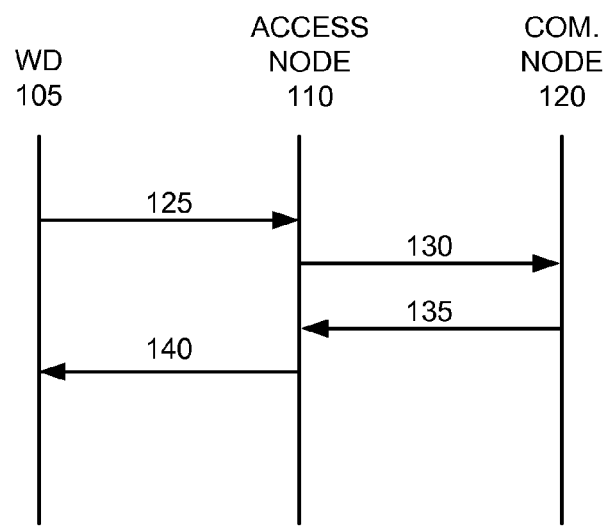
FIG. 1B illustrates an exemplary signal flow diagram of a communication system.

FIG. 1B illustrates an exemplary signal flow diagram of a registration attempt by wireless device 105. Wireless device 105 sends a registration request message 125 to the access node 110, which passes a registration request message 130 to the communication node 120. Communication node 120 authenticates the wireless device 105, for example, by requesting information from a user information database such as a home location register and/or an authentication node (not illustrated), and when the wireless device is authenticated, the communication node sends a service authorization message 135 to the access node 110, which passes a service authorization message 140 to the wireless device 105. In an embodiment, the registration message 125 from the wireless device 105 to the communication node 110 can comprise a network identifier.

Based on a network identifier, the type of network through which the wireless device 105 communicates with the communication system 100A can be determined to be a network characterized as a high latency network or a low latency network. A network can be characterized as high or low latency based at least in part on the time required to set up a communication session. Communication session set up time can be determined, for example, by the time required to set up a traffic channel (TCH) and/or a paging cycle employed by the network. An example of a high latency network is a 1xRTT (Radio Transmission Technology) network. In a 1xRTT network, a typical average TCH set up time is about 1.5 s and a typical paging cycle is about 5.2 s. An example of a low latency network is a 1xEV-DO Rev. A (Evolution-Data Optimized Revision A, or simply EV-DO) network. In an EVDO Rev. A network, the average TCH setup time is 500 ms and paging cycle can be less than 300 ms. Thus, an EV-DO Rev. A network can be considered a fast network as compared to a 1xRTT network. Thus, the terms high latency and low latency represent clear distinctions among types of networks. A latency threshold can be used to distinguish between high latency networks and low latency networks. A latency threshold can be determined, for example, by a network operator having insight into call setup times of various subnetwork types within its overall network.

Figure 2:
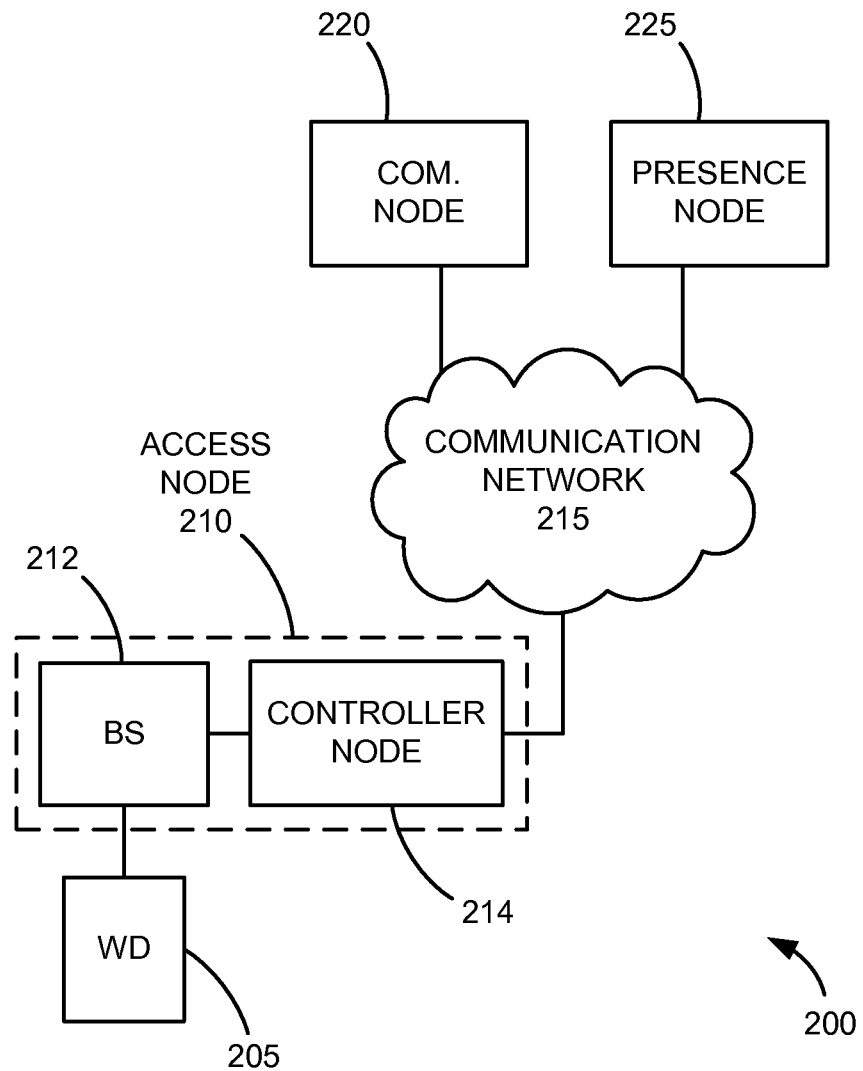
FIG. 2 illustrates an exemplary communication system.

FIG. 2 illustrates exemplary communication system 200 comprising a wireless device 205, an access node 210, a communication network 215, a communication node 220, and a presence node 225. Other network elements may be present in the communication system 200 to facilitate wireless communication but are omitted for clarity, such as gateways, routers, mobile switching centers, and location registers such as a home location register or visitor location register. Examples of a wireless device 205 include a telephone, a computer, a personal digital assistant, an internet access device, or other device capable of wireless communication (such as PTT wireless communication), including combinations thereof. Access node 210 communicates with the wireless device 205, and comprises a base station 212 and a controller node 214.

Communication network 215 is a network or internetwork and is in communication with the access node 210. Communication node 220 is a network node which permits the wireless device 205 to register with a communication system, and is in communication with the communication network 215. The registration information may include a network identifier for the device 205. Presence node 225 is a network node which provides presence information about devices in communication with the communication system 200, including other wireless devices. One example of a presence node 225 is a resource list server, though other network elements can perform similar functions. The presence node 225 can reduce network latency by maintaining periodically updated presence information and network identification information about devices in communication with the system 200. The wireless device 205, the access node 210, the communication network 215, the communication node 220, and the presence node 225 each communicate over wired or wireless communication links or combinations thereof, analogous to the communication links described above regarding FIG. 1A.

Figure 3:
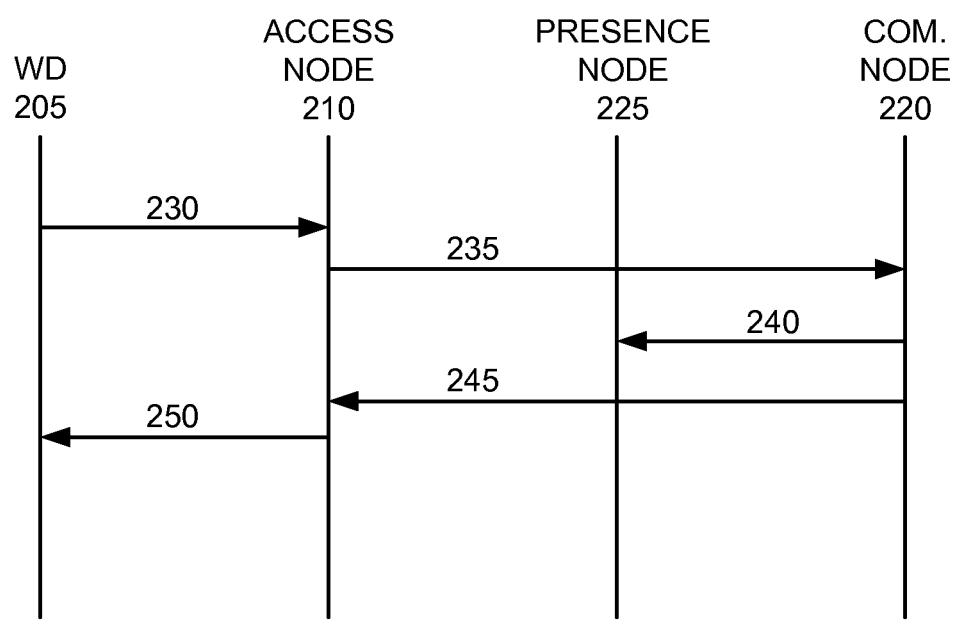
FIG. 3 illustrates an exemplary signal flow diagram of a communication system.

FIG. 3 illustrates an exemplary signal flow diagram of a registration attempt by wireless device 205. Wireless device 205 sends a registration request message 230 to the access node 210, which passes a registration request message 235 to the communication node 220. Communication node 220 authenticates the wireless device 205, for example, by requesting information from a user information database such as a home location register and/or an authentication node (not illustrated). The registration message to the communication node 200 may contain the network identifier for the device 205.

If the wireless device is authenticated, the communication node can send information 240 about the wireless device 205 to the presence node 225, which may include the network identifier. The communication node 220 can also send a service authorization message 245 to the access node 210, which passes a service authorization message 250 to the wireless device 205. In an embodiment, communication node 220 can store the network identifier from the wireless device 205 to be used for adjusting the timers during call setup from that device. The communication network will thereafter set up a communication channel for the wireless device 205. In addition, presence information will be periodically updated in presence node 225 for the wireless device 205. Furthermore, the communication node 220 may also update the network identified from the wireless device 205, for example, when the wireless device 205 re-registers with the communication system, as the wireless device 205 may do periodically.

Figure 4:
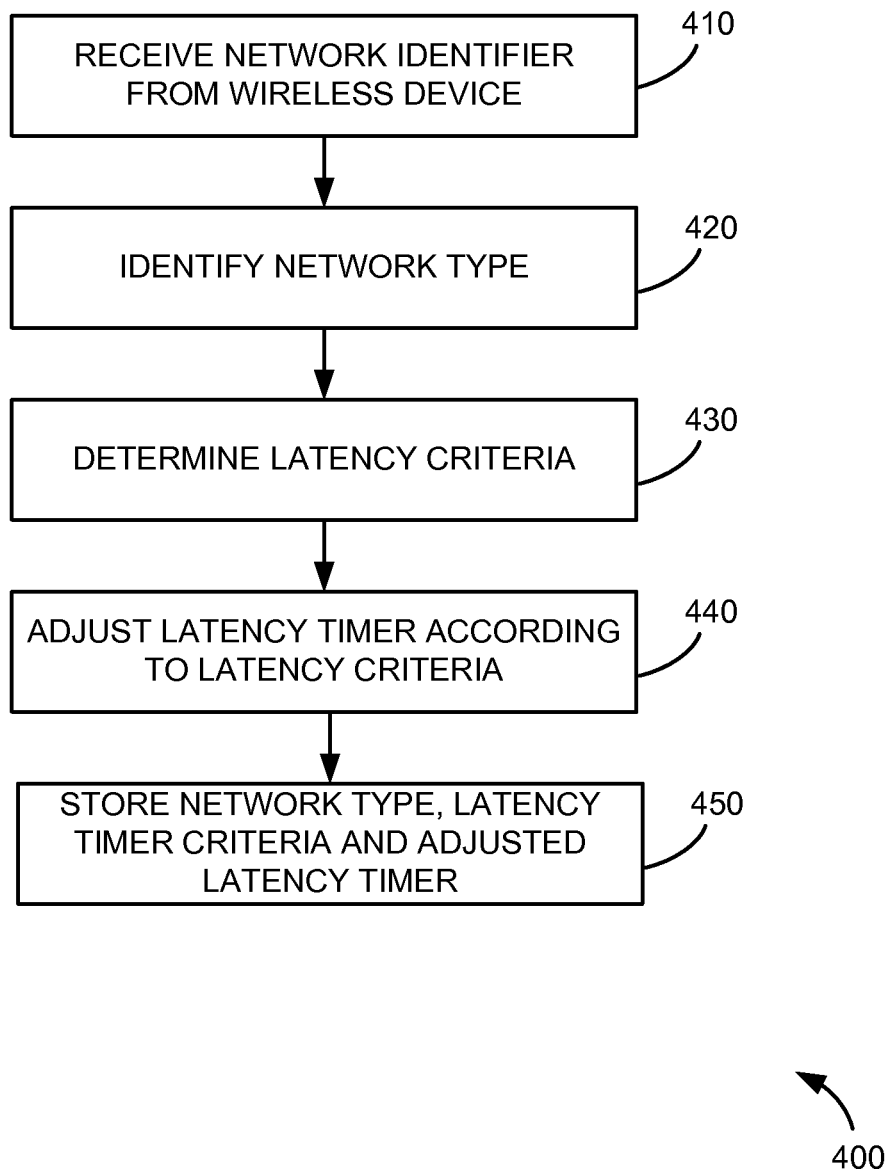
FIG. 4 illustrates an exemplary method of varying a latency timer in a wireless communication network.

FIG. 4 illustrates an exemplary method 400 of varying a latency timer in a wireless communication network, for example the exemplary communication networks illustrated in FIGS. 1A and 2. In operation 410, a network identifier is received from a wireless device, such as wireless device 205, during, for example, call setup, and in one example can be received at the communication node 220. Based on the network identifier, the type of network through which the wireless device is communicating with the communication system 200 is identified. The network identifier can be information provided by the wireless device 205, for example information included with the registration request message 230. The network identifier can also be information about the source of the registration request message, such as an internet protocol address associated with the registration request message 230. For example, if a registration request message is received from a base station controller, it may be determined that the wireless device is communicating through, for example, a 1xRTT network; if, for example, a registration request message is received from a radio network controller, it may be determined that the wireless device is communicating through, for example, an EV-DO network. Based on the network identifier, the network type can be determined to be a high latency network or a low latency network (operation 420).

In operation 430, based on the identified network type, latency criteria are determined. Examples of latency criteria include an identification of latency timers related to registration and appropriate latency timer settings for the identified network type. An example of a registration-related latency timer is a registration reliability timer, which can count a time period for the complete transmission of a registration request message; if the registration request message is not completely received within this time period, retransmission of the registration request message may be required. Another example of registration-related latency timer is a registration completion timer, which counts a time period during which registration of a wireless device must be completed; if registration is not completed within this timer period, the registration must be re-attempted. Additional examples are also possible.

Latency criteria can be determined for the latency timer or timers which are appropriate for the determined network type, for example, a time period for the latency timer based on the determined network type. In operation, latency timer settings will be longer for high latency networks and shorter for low latency networks. In one example, an appropriate setting for the registration reliability timer could be 1500 ms for a low latency network and 2000 ms for a high latency network, though any appropriate timer settings can be determined. In another example, an appropriate setting for the registration completion timer could be 5000 ms for a low latency network and 7000 ms for a high latency network. A latency timer may be, for example, in the communication node 220, or in the access node 210, or in the wireless device 205.

In operation 440, the latency timer is adjusted according to the determined latency criteria. For example, the latency timer can be adjusted according to a message from the communication node 220, which can comprise a rule or other indication of the adjustment of the latency timer. The determined network type, the determined latency timer criteria and the adjusted latency timer setting are stored in operation 450. For example, this information can be stored in a memory of the communication node 220, the access node 210, or the wireless device 205. Although one latency timer is described above, the method can also be applied to a plurality of latency timers and related latency criteria.

Figure 5:
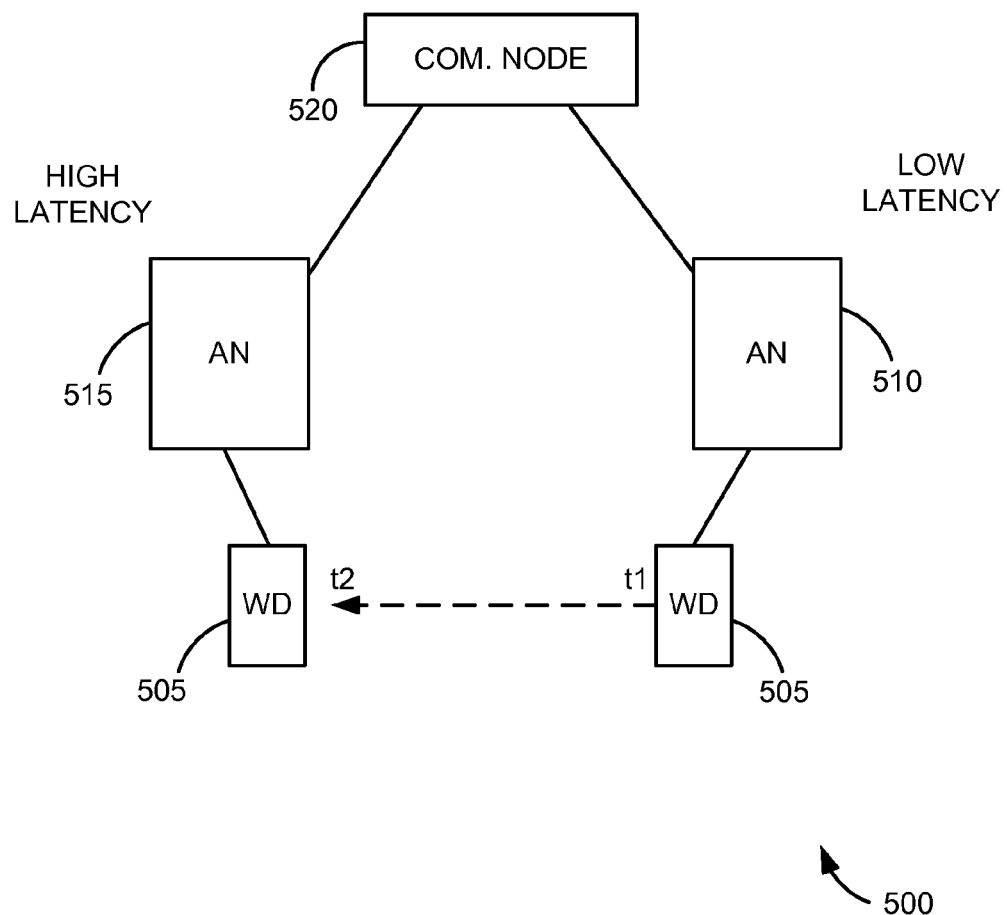
FIG. 5 illustrates an exemplary communication system.

FIG. 5 illustrates an exemplary communication system 500 in which a wireless device 505 changes the access node through which it is in communication with the communication system 500. In addition to the network elements illustrated in FIG. 5, communication system 500 comprises additional elements, for example, such as illustrated in and described with reference to FIGS. 1A and 2, but which are omitted for brevity.

At a first time t1, wireless device 505 is in communication with access node 510. Through access node 510, wireless device is registered with a communication network by a communication session controlled by communication node 520. The communications network through which the wireless device is communicating is a low latency network. As illustrated in FIG. 5, at a second time t2 the wireless device 505 changes from access node 510 to access node 515. This change could occur for many reasons. For example, wireless device 505 could move spatially, and could be handed off from access node 510 to access node 515 because, for example, access node 515 serves the new geographic location of wireless device 505 better than access node 510. As another example, because of network congestion or capacity issues at access node 510, the wireless device 505 can be handed over to access node 515. As another example, wireless device could roam from a first network (for example, served by access node 510) to a second network (for example, served by access node 515). When the wireless device 505 is in communication with the communication system 500 through access node 515, the wireless device 505 is communicating through a high latency network.

Upon handoff to access node 515, a network identifier is received at communication node 520. In this example, the network identifier is a new network identifier, since the wireless device 505 is moving to a different access node. Based on the network identifier, the type of network through which the wireless device 505 is communicating with the communication system 500 is identified. The network identifier can be information provided by the wireless device 505. The network identifier can also be information, such as an internet protocol source address associated with a registration request message from wireless device 505. Based on the network identifier, the network type can be determined to be a high latency network.

Based on the identified network type, latency criteria are determined. Examples of latency criteria include an identification of latency timers related to registration and appropriate latency timer settings for the identified network type. An example of a registration-related latency timer is a registration reliability timer, which can count a time period for the complete transmission of a registration request message; if the registration request message is not completely received within this time period, retransmission of the registration request message may be required. Another example of registration-related latency timer is a registration completion timer, which counts a time period during which registration of a wireless device must be completed; if registration is not completed within this timer period, the registration must be re-attempted.

Other examples of latency criteria include an identification of timers related to call setup and appropriate latency timer settings for the identified network type. For example, a status wait timer can count a time period during which a call setup process must be completed, else the call setup process will be re-attempted. As another example, a media wait timer can count a timer period during which a media channel is unavailable, else re-transmission will be requested. As yet another example, a paging reliability retransmit timer can count a timer period during which a target wireless device (an intended recipient of a message) must respond to a page message, else the sending communication node will resend the page message. As a further example, a call abort timer can count a time period during which a call request must be accepted, else the call attempt will be aborted. Additional examples are also possible. A latency timer or timers may reside, for example, in the communication node 520, or in the access node 510 or 515, or in the wireless device 505. In an embodiment, the timers are PTT timers of a PTT communication system.

Latency criteria can be determined for the latency timer which are appropriate for the determined network type, for example, a time period for each latency timer based on the determined network type. In one example, appropriate timer settings for the status wait timer could be 5000 ms for a low latency network and 8000 ms for a high latency network. In another example, appropriate timer settings for the media wait timer could be 5000 ms for a low latency network and 7000 ms for a high latency network. In a further example, appropriate timer settings for the paging reliability retransmit timer could be 5 s for a low latency network and 9 s for a high latency network. In yet another example, appropriate timer settings for the call abort timer could be 9 s for a low latency network and 12 s for a high latency network. Latency timer criteria may be determined in the communication node 520, and can be synchronized with timers in the wireless device 505.

The latency timer is adjusted according to the determined (or predetermined) latency criteria. For example, the latency timer can be adjusted according to a message from the communication node 520. The determined network type, the determined latency timer criteria and the adjusted latency timer setting are stored, for example, in a memory of the communication node 520 and/or the wireless device 505.

While the example described with reference to FIG. 5 describes a wireless device moving from a low latency network to a high latency network, the description can also be applied to a situation where a wireless device moves from a high latency network to a low latency network.

Figure 6:
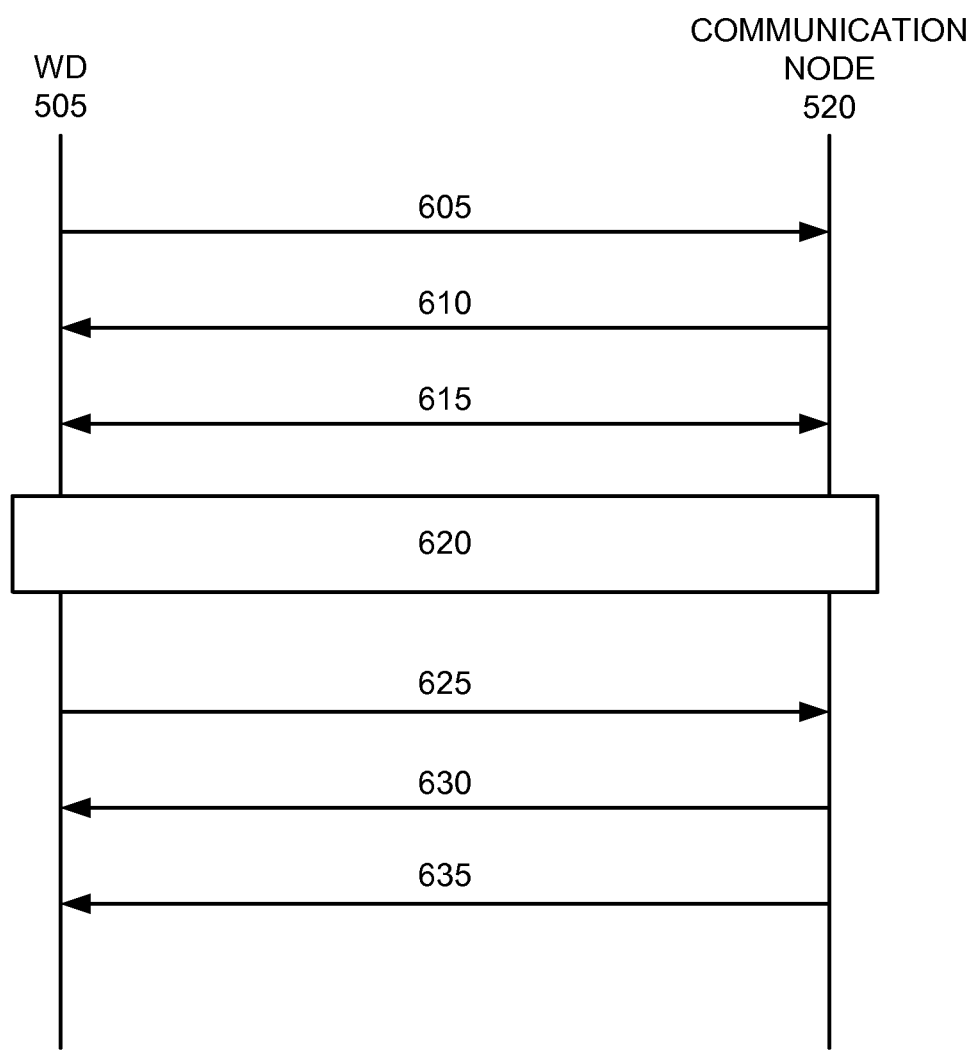
FIG. 6 illustrates a signal flow diagram in a communication system of signals between a wireless device and a communication node.

FIG. 6 illustrates a signal flow diagram in a communication system of signals between a wireless device and a communication node, for example, wireless device 505 and communication node 520. During a first time, wireless device 505 sends a registration request message 605, which can include a network identifier, to the communication node 520, and the communication node 520 responds with a service authorization response 610, after which a PTT communication session 615 is established for wireless device 505. At a second time 620, wireless device 505 is handed off to a high latency network. A new network identifier is received in message 625 at the communication node 520, and the communication node 520 may acknowledge receipt of the network identifier in message 630. Based on the new network identifier, the type of network through which the wireless device 505 is communicating is identified, in this case as a high latency network. Based on the identified network type, latency criteria are determined for a latency timer which are appropriate for the determined network type, for example, a time period for a latency timer based on the determined network type. The latency timer is adjusted (in message 635) according to the determined latency criteria. For example, the timer can be adjusted according to a message from the communication node 520.

Figure 7:
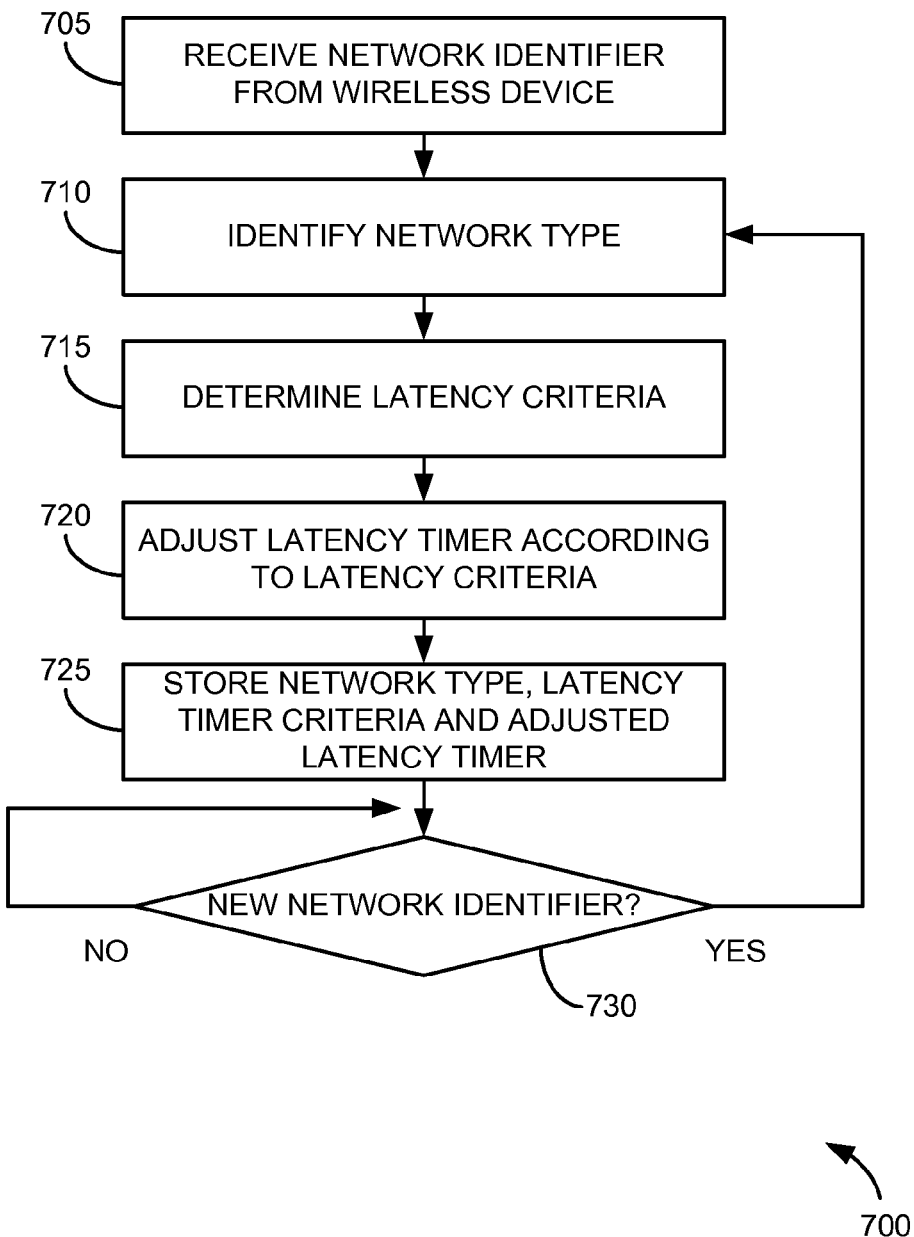
FIG. 7 illustrates a flowchart of an exemplary method of varying a latency timer in a communication system.

FIG. 7 illustrates a flowchart of an exemplary method 700 of varying a latency timer in a communication system. In operation 705, a network identifier is received from a wireless device. The network identifier identifies a type of network through which a wireless device is in communication with a communication system. For example, a network identifier can indicate that wireless device 505 is in communication through a low latency network through access node 510. Based on the network identifier, the type of network through which the wireless device 505 is communicating with the communication system 500 is identified (operation 710). The network identifier can be information provided by the wireless device 505. The network identifier can also be information, such as an internet protocol source address associated with a registration request message from wireless device 505. Based on the network identifier, the network type can be determined to be a low latency network.

Based on the identified network type, latency criteria are determined (operation 715). Examples of latency criteria include an identification of a latency timer related to registration and/or related to call setup, and appropriate latency timer settings for the identified network type. Latency criteria can be determined for latency timers which are appropriate for the determined network type, for example, a time period for the latency timer based on the determined network type.

The latency timer or timers are adjusted according to the determined latency criteria (operation 720). For example, a timer can be adjusted according to a message from the communication node 520 to the wireless device 505. The determined network type, the determined latency timer criteria and the adjusted latency timer setting are stored (operation 725), for example, in a memory of the communication node 520 or the wireless device 505.

In operation 730, if no new network identifier is detected, no adjustment is made to the latency timer. When a new network identifier is detected (operation 730, YES), then based on the new network identifier the process can be repeated.

Figure 8:
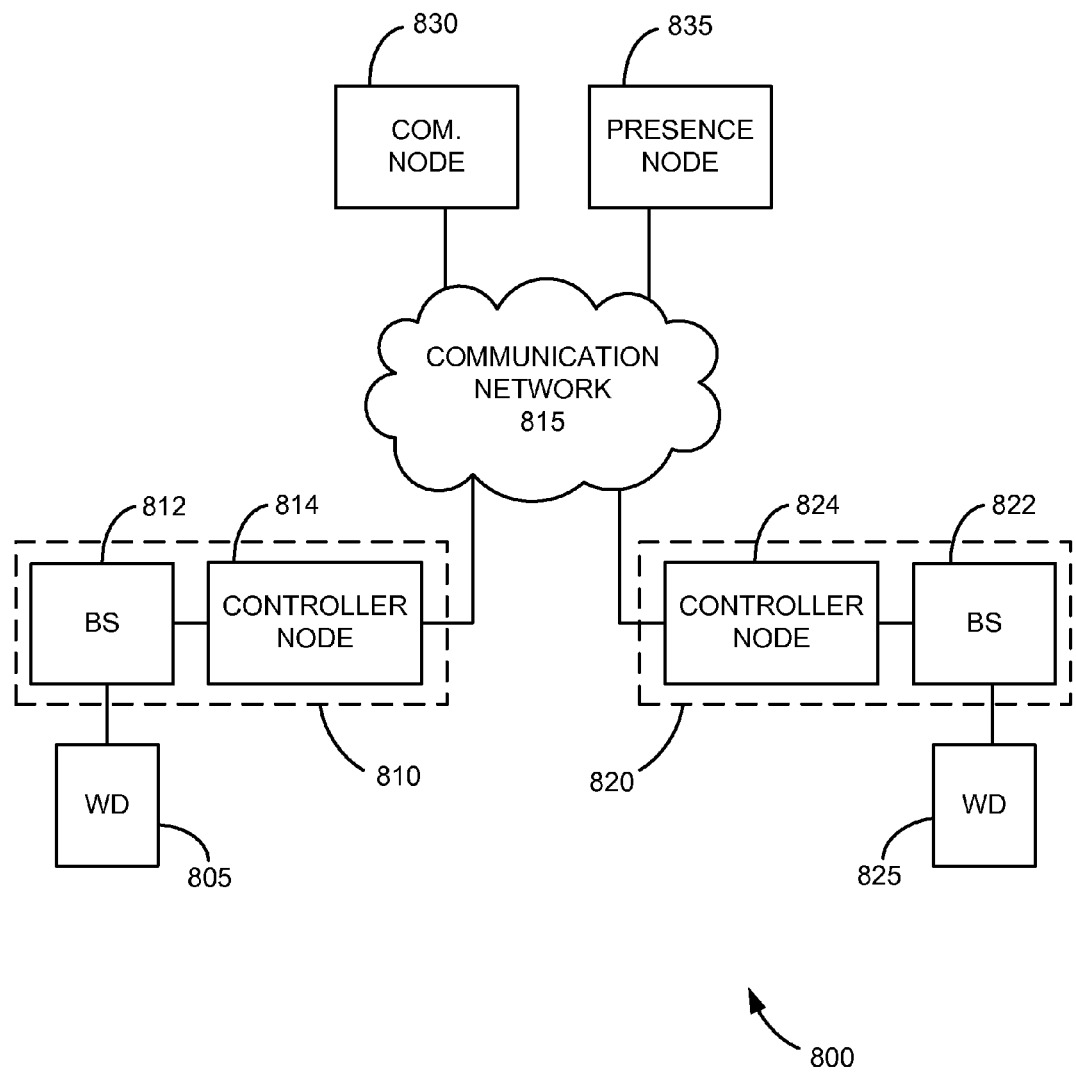
FIG. 8 illustrates an exemplary communication system.

FIG. 8 illustrates an exemplary communication system 800 comprising wireless device 805, access node 810, communication network 815, access node 820, wireless device 825, communication node 830, and presence node 835. Other network elements may be present in the communication system 800 to facilitate wireless communication but are omitted for clarity, such as gateways, routers, mobile switching centers, and location registers such as a home location register or visitor location register. Access node 810 communicates with the wireless device 805, and comprises a base station 812 and a controller node 814. Examples of a controller node 814 include a base station controller and a radio network controller, as well as other network elements which can perform similar functions. Access node 810 communicates with wireless device 805 and with communication network 815. Wireless device 825 and access node 820 are analogous to wireless device 805 and access node 810, respectively.

Communication network 815 is a network or internetwork and is in communication with the access nodes 810 and 820. Communication node 830 is a network node which permits the wireless devices 805 and 825 to register with communication system 800, and is in communication with the communication network 815. Presence node 835 is a network node which provides presence information about devices in communication with the communication system 800, including other wireless devices. One example of a presence node 835 is a resource list server, though other network elements can perform similar functions. The wireless devices 805 and 825, access nodes 810 and 820, communication network 815, communication node 830, and presence node 835 each communicate over wired or wireless communication links or combinations thereof, analogous to the communication links described above regarding FIG. 1A. The network types through which the wireless devices 805 and 825 are in communication with the communication system can be different network types; for example, wireless device 805 can be in communication with the system through a low latency network, and wireless device 825 can be in communication with the system through a high latency network.

Figure 9:
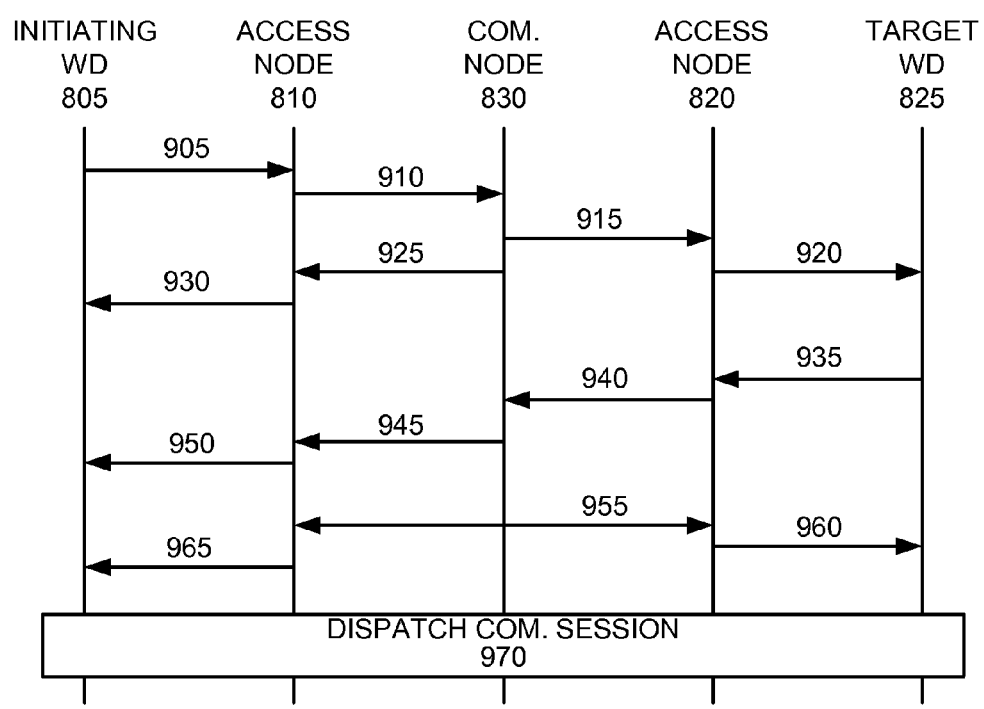
FIG. 9 illustrates an exemplary signal flow diagram of a communication system.

FIG. 9 is an exemplary signal flow diagram illustrating varying a latency timer in a communication system. An initiating wireless device, such as wireless device 805, which is connected to the communication system through a low latency network, sends a call setup request 905 to access node 810, which passes the call setup request 910 to communication node 830. The call setup request 905 from wireless device 805 requests that a communication session be established with a target wireless device, such as wireless device 825. The communication node 830 sends a call setup request message 915 to access node 820, which passes a call paging request message 920 to the target wireless device 825. In an embodiment, the communication system can be a PTT communication system.

When the call setup request 910 is received at the communication node 830, the communication node 830 can determine the network types of the initiating wireless device 805 and the target wireless device 825, and can determine, for example, that the target wireless device 825 is connected to the communication system through a high latency network, and that the initiating wireless device 805 is connected to the communication system through a low latency network. In an embodiment, the determinations can be based on previously stored information. Communication node 830 can also send this network type information (message 925) to the access node 810, which passes the network type information 930 to the initiating wireless device 805. In an embodiment, the communication node 830 determines the network type of the target wireless device 825 when wireless device 825 registers with the communication system.

Based on the identified network type of each wireless device, latency criteria are determined. Examples of latency criteria include an identification of latency timers related to call setup and the appropriate latency timer settings for the identified network type. A latency timer can be adjusted in the communication node 830 and/or in the initiating wireless device 805 based on the determined network type of the target wireless device 825. The latency timer is then adjusted according to the determined latency criteria. For example, the latency timer can be adjusted according to a message from the communication node 830, such as the network type information (in message 925), or other message sent by communication node 830 to wireless device 805 (which can be sent directly). The determined network type, the determined latency timer criteria and the adjusted latency timer setting are then stored, for example, in a memory of the communication node 830, the access node 810, or the initiating wireless device 805.

With the latency timer adjusted appropriately, the call setup attempt with the target wireless device 825 (such as a call paging request) communicating through a high latency network will have sufficient time to proceed to completion. Thus, the target wireless device 825 can respond with a call paging request acknowledgment (message 935) to the access node 820, which can pass a call paging request acknowledgment 940 to the communication node 830. The communication node 830 can, in a dispatch call environment, send a floor grant message 945 to access node 810, which passes a floor grant message 950 to the initiating wireless device 805. Thereafter, the communication node 830 can send a connection indication (in message 955) to each of the access nodes 810 and 820, which pass on connection indications 960 and 965 to wireless devices 825 and 805, respectively, and a dispatch communication session (or media communication session) 970 can proceed between wireless devices 805 and 825.

Figure 10:
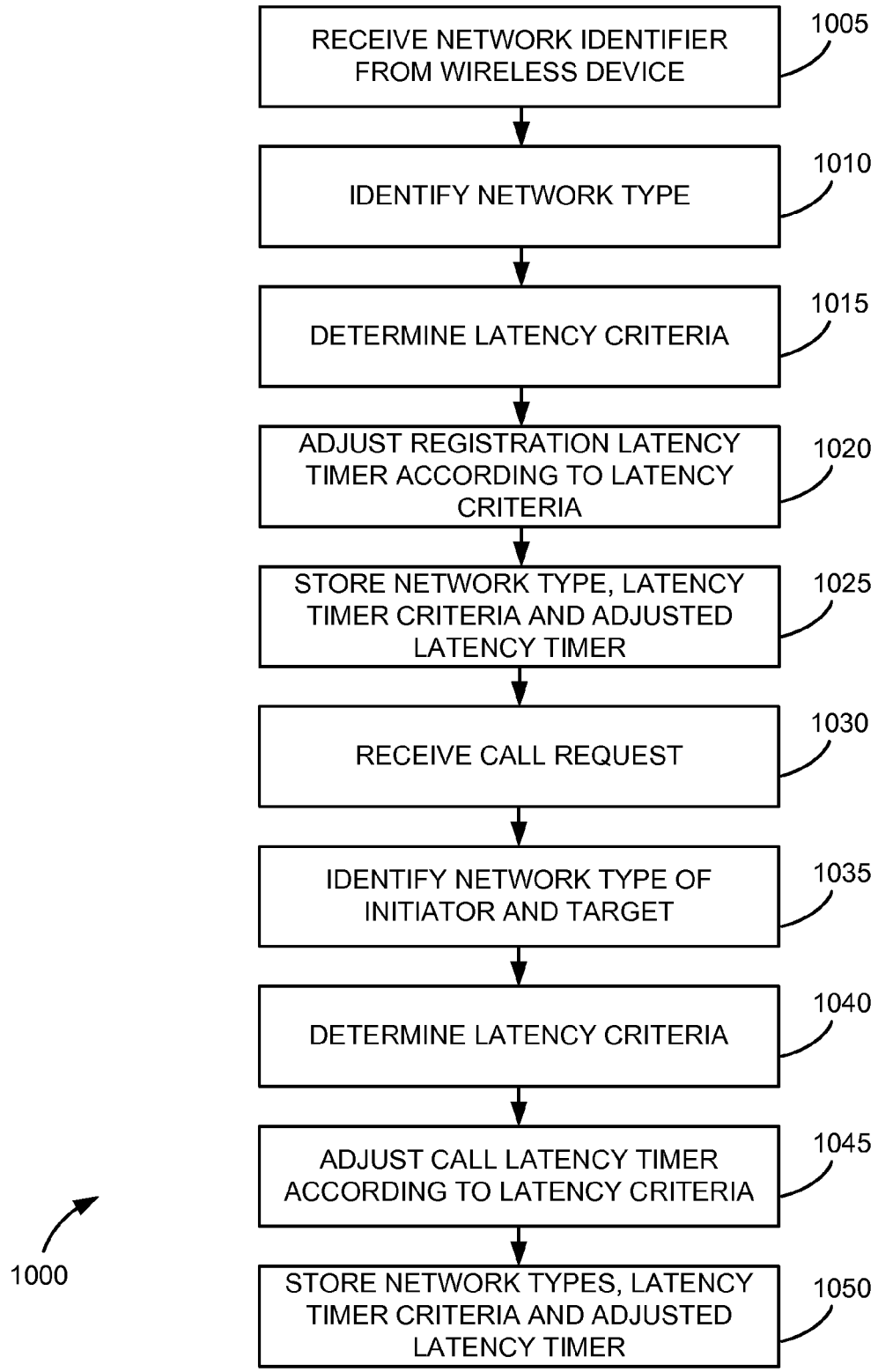
FIG. 10 illustrates an exemplary method of varying a latency timer in a communication system.

FIG. 10 illustrates an exemplary method 1000 of varying a latency timer in a wireless communication network, for example the exemplary communication network illustrated in FIG. 8. In operation 1005, a network identifier is received from a wireless device, such as wireless device 825, and in one example can be received at the communication node 830. Based on the network identifier, the type of network through which the wireless device is communicating with the communication system 800 is identified. The network identifier can be information provided by the wireless device 825, or it can be information source information, such as an internet protocol source address associated with a registration request message or a call setup message. Based on the network identifier, the network type can be determined to be a high latency network or a low latency network (operation 1010).

In operation 1015, based on the identified network type, latency criteria are determined. Latency criteria can be determined for a latency timer or timers which are appropriate for the determined network type, for example, a time period for the latency timer based on the determined network type. A latency timer may be, for example, in the communication node 830 or in the wireless device 825.

In operation 1020, a latency timer related to registration is adjusted according to the determined latency criteria. For example, the timer can be adjusted according to a message from the communication node 830. The determined network type, the determined latency timer criteria and the adjusted registration latency timer setting are stored in operation 1025. For example, this information can be stored in a memory of the communication node 830, the access node 820, or the wireless device 825.

In operation 1030, a call request can be received, for example, from wireless device 805 for wireless device 825. When the call setup request 910 is received at the communication node 830, the communication node 830 can identify the network types of the initiating wireless device 805 and the target wireless device 825 (based, for example, on previous registration information, or from the call setup message), and can identify that the target wireless device 825 is connected to the communication system through a high latency network (operation 1035). Based on the identified network type, latency criteria are determined (operation 1040). A call latency timer can be adjusted based on the determined latency criteria (operation 1045). The latency timer can be adjusted in the communication node 830 and/or in wireless device 805 or 825 based on the determined network types of the target and/or initiating wireless devices. The latency timer can be adjusted according to a message from the communication node 830. The determined network type, the determined latency timer criteria and the adjusted latency timer setting are then stored, for example, in a memory of the communication node 830 or the wireless device 805 or 825 (operation 1050). With the latency timer adjusted appropriately, the call setup attempt with the target wireless device 825 communicating through a high latency network will proceed to completion.

As would be understood, FIG. 10 represents one path for establishing the latency timer in the communication network of FIG. 8. Varying the latency timer is an iterative process and should a call not be received at operation 1030, the process would begin again at operation 1005. This iterative process would continue as the network identifier (operation 1005) or call requests (operation 1030) change over time.

Figure 11:
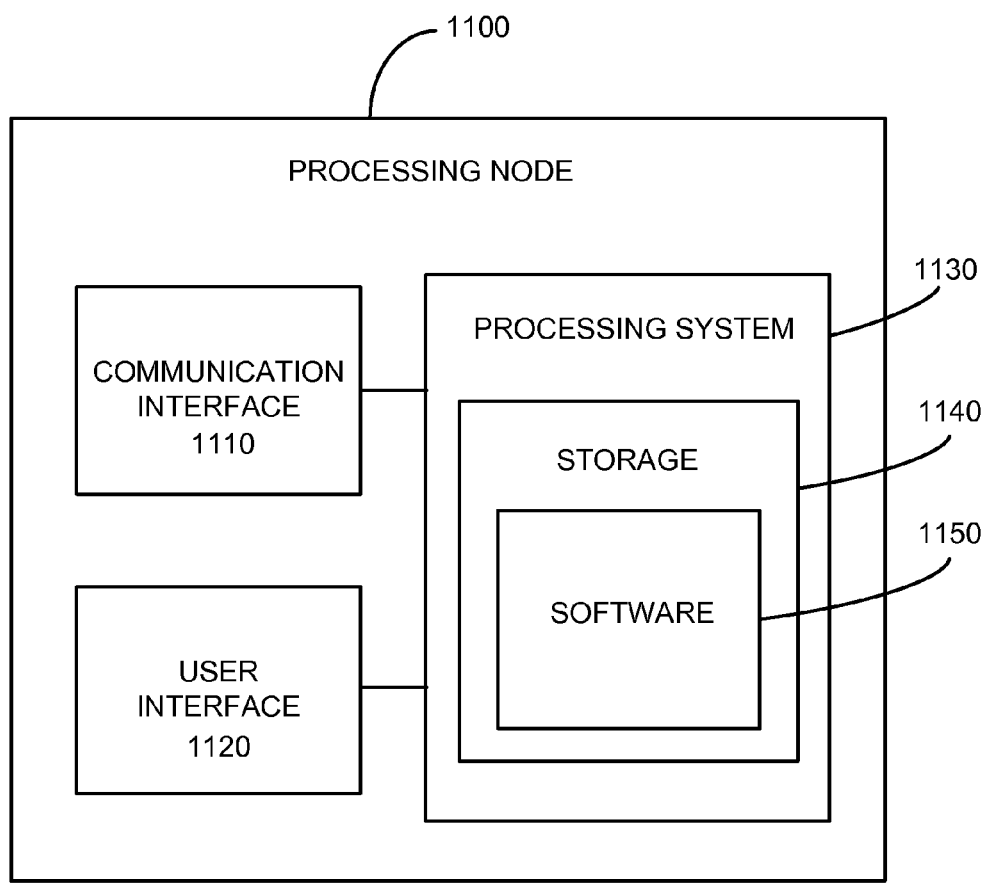
FIG. 11 illustrates an exemplary processing node.

FIG. 11 illustrates exemplary processing node 1100. Processing node 1100 can include a communication interface 1110 and a user interface 1120, each in communication with a processing system 1130. Processing node 1100 is a network element, examples of which include communication node 120, access node 110, access node 210, communication node 220, presence node 225, communication node 520, access nodes 510 and 515, access nodes 810 and 820, communication node 830, and presence node 835. Processing system 1130 can include storage 1140. Storage 1140 comprises a disk drive, flash drive, memory circuitry, or other memory device. Storage 1140 can store software 1150 which is used in the operation of the processing node 1100. Software 1150 may include an operating system, utilities, drivers, network interfaces, applications, or some other type of software. Processing node 1100 can also include a user interface 1120 to permit a user to configure and control the operation of the processing node 1100.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of varying a latency timer in a wireless communication system, comprising:

receiving at a communication node from a first wireless device a first network identifier associated with an access node in communication with the first wireless device during the establishment of a communication session between the first wireless device and the communication node, wherein the access node is associated with a first communication network, and wherein the first network identifier indicates a network latency of the first communication network;

determining at least one registration latency timer criteria based on the first network identifier;

adjusting at least one registration latency timer according to the determined at least one registration latency timer criteria to complete a registration of the first wireless device with the wireless communication system;

receiving at the communication node a call request comprising a second network identifier from a second wireless device in communication with a second access node associated with a second communication network;

determining at least one call latency timer criteria based on the second network identifier; and adjusting at least one call latency timer according to the determined at least one call latency timer criteria to complete a call setup between the wireless device and the second wireless device.

2. The method of claim 1, wherein the first network identifier comprises a registration request message to the communication node.

3. The method of claim 1, wherein the first network identifier comprises an access node identifier associated with the access node.

4. The method of claim 1, wherein the act of adjusting the at least one registration latency timer further comprises:

adjusting the at least one registration latency timer according to the determined at least one registration latency timer criteria when the first wireless device sends a registration request message to the communication node.

5. The method of claim 1, wherein the first network is characterized as a high latency network and the second network is characterized as a low latency network.

6. The method of claim 1, wherein the at least one registration latency timer is associated with the first wireless device.

7. A system for varying a latency timer in a wireless communication system, comprising:

an access node in communication with a first wireless device, wherein the access node is associated with a first communication network; and a communication node in communication with the first wireless device through the access node configured to receive a first network identifier associated with the access node during the establishment of a communication session between the first wireless device and the communication node, wherein the network identifier indicates a network latency of the wireless communication system, to determine at least one registration latency timer criteria based on the network identifier, and to adjust at least one registration latency timer in at least one of the communication server and the first wireless device according to the determined at least one registration latency timer criteria to complete a registration of the first wireless device with the wireless communication system, and receive a call request comprising a second network identifier from a second wireless device in communication with a second access node associated with a second communication network, determine at least one call latency timer criteria based on the second network identifier, and adjust at least one call latency timer according to the determined at least one call latency timer criteria to complete a call setup between the first wireless device and the second wireless device.

8. The system of claim 7, wherein the communication node receives the first network identifier when the first wireless device sends a registration request message to the communication server.

9. The system of claim 7, wherein the access node further comprises a controller node to control the communication of the first wireless device and the communication node, wherein the first network identifier is associated with the controller node.

10. The system of claim 7, wherein the communication node receives the second network identifier when the first wireless device receives a call paging request from the second wireless device.

11. The system of claim 10, wherein the communication node adjusts the at least one latency timer in response a call paging request to the first wireless device from the second wireless device.

12. The system of claim 11, wherein a network of the first access node is characterized as a high latency network and a network of the second access node is characterized as a low latency network.

13. The system of claim 7, wherein the communication node adjusts the at least one registration latency timer in response to a registration request message from the first wireless device.

14. A method of varying a latency timer in a wireless communication system, comprising:

receiving an access node identifier from a first wireless device at a communication node during the establishment of a communication session between the first wireless device and the communication node, wherein the access node identifier indicates a network latency of a first communication network;

determining at least one registration latency timer criteria based on the access node identifier;

adjusting at least one registration latency timer associated with the wireless device according to the determined at least one registration latency timer criteria to complete a registration of the wireless device with the wireless communication system;

receiving at the communication node a call request comprising a second network identifier from a second wireless device in communication with a second access node associated with a second communication network;

determining at least one call latency timer criteria based on the second network identifier; and adjusting at least one call latency timer according to the determined at least one call latency timer criteria to complete a call setup between the wireless device and the second wireless device.

15. The method of claim 14, wherein the act of adjusting further comprises:

adjusting at least one registration latency timer associated with the first wireless device according to the determined at least one registration latency timer criteria during a registration process.

* * * * *